Nov. 4, 1924.                                                          1,514,357
                              W. WHELAN
                 STUD EXTRACTING AND THREAD CUTTING DEVICE
                           Filed June 6, 1921

Inventor-
William Whelan,
By. B. Singer
Atty

Patented Nov. 4, 1924.

1,514,357

UNITED STATES PATENT OFFICE.

WILLIAM WHELAN, OF MUTLEY, PLYMOUTH, ENGLAND.

STUD-EXTRACTING AND THREAD-CUTTING DEVICE.

Application filed June 6, 1921. Serial No. 475,473.

*To all whom it may concern:*

Be it known that I, WILLIAM WHELAN, a subject of the Kingdom of Great Britain, residing at 2 Moor View, Mutley, Plymouth, England, have invented certain new and useful Improvements in Stud-Extracting and Thread-Cutting Devices, of which the following is a specification.

This invention relates to a new or improved engineer's tool or device for extracting and inserting screw threaded stud bolts of the kind which are used in boilers for securing the covered plates and which is applicable where screw threaded studs are used for any bolting-down purposes.

According to the present invention the tool or device involves a tubular or hollow body part having an internal tapering cavity wherein a tapering split die or sleeve internally tapped is adapted to operate and a nut or like member having a left-hand screw connection with the body part is adapted to bear against the die or sleeve for causing same to be contracted by the co-acting tapering face to grip a screwed stud engaged with the said die or sleeve for the extraction or insertion of the said stud. By the reverse rotation of the nut or like member the stud may be released from the sleeve or die. A feature of the present invention consists in the means or provision for cutting or extending a screw thread upon a stud prior to its extraction in cases where same is necessary or desirable.

In order that this invention may be clearly understood and readily carried into practice, reference may be had to the appended explanatory sheet of drawings, upon which:—

Figure 2:
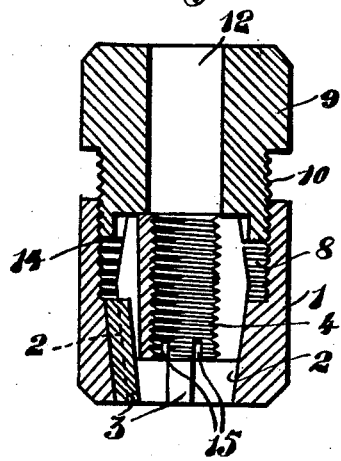
Figure 2 is a vertical section through the tool shown in Figure 1.
Figure 3:
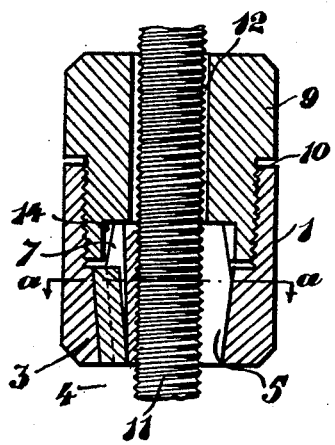
Figure 3 is also a vertical section through the tool illustrating same in use upon a stud.
Figure 4:
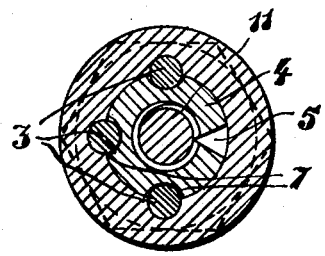
Figure 4 is a horizontal section on line *a a* of Figure 3
Figure 5:
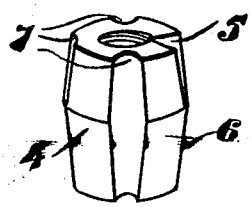
Figure 5 illustrates in perspective the tapering split die or sleeve involved in the present invention.

In a convenient embodiment of the present invention the body part 1 of the device is of hollow cylindrical or tubular formation open at its extremities. Provided internally within this body part is a tapering bore or cavity 2 and within this tapering bore or cavity are three, four or other suitable number of keys 3 disposed against the face of the cavity. These keys may be formed from stout wire or circular section metal which may be accommodated in grooves in the face of the tapering cavity. Adapted to operate within this tapering cavity is the contractile die or sleeve 4. This member illustrated particularly in Figure 5, is double frusto-conical form and is split longitudinally at 5. The lower part 6 of the external annular face is of tapering formation to correspond with the tapering cavity 2 and three, four or other suitable number of grooves 7 are provided longitudinally upon the external face of the die or sleeve to cooperate with the aforementioned keys 3. Internally this die or sleeve 4 is tapped with a right-hand screw thread and the arrangement is such that when the said die or sleeve is disposed within its cavity 2 the upper part projects into an upper open space 8 of the body part. A screw member 9 having a left-hand screw thread 10 is adapted to cooperate with a corresponding screw thread provided laterally in the upper mouth or upper open part of the body part and this screw 9 can be brought to bear upon the upper projecting part of the die or sleeve 4 to force same downwardly into the tapering cavity 2 and cause the said die or sleeve to be contracted on to the stud 11 for efficiently gripping same as shown in Figure 3. The screw or like member 9 may be bored concentrically at 12 to permit of the passage of a long projecting stud 11 through same. A hexagonal formation 13 adjacent the bottom or lower part thereof is provided externally upon the body part and the arrangement is such that when the sleeve or die 4 is in position in the body part the lower extremity of said sleeve member or die lies normally adjacent or not far removed from the bottom or lower part of the body part or device, as shown in Figure 2. The screw or like member 9 may be recessed at 14 for the reception of the upper part of the die or sleeve 4.

Figure 1:
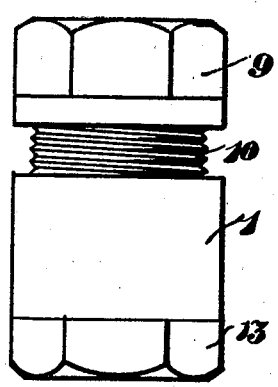
Figure 1 is an elevation of a tool constructed according to the present invention.

In operation the device complete with the sleeve or die 4 and screw 9 screwed loosely against same by the hand as shown in Figures 1 and 2 is screwed onto the stud to be removed for the desired distance and the screw 9 is then tightened by its left-hand screw thread and the body part 1 held. The body part is then released and the continued rotation of the screw 9 still further tightens the die or sleeve onto the stud and causes same to finally be rotated with the device and withdrawn. The operation is reversed for the insertion of a stud. The stud is first tightly clamped in the body part by the screw and the device rotated to insert the stud. The screw 9 may be readily unscrewed by holding the body part 2 by means of its hexagonal or equivalent formation 13. An important feature of the present invention consists in the fact that the present device may be employed for cutting or extending the thread upon a stud prior to its extraction. In order to effect this the screw 9 may be screwed home in relation to the body part with moderate pressure and the body part 1 rotated upon the stud to cause the die or sleeve to continue or extend the screw thread on the stud on account of its split construction, and so enable a more efficient grip to be obtained of the said stud in the case of a very short projecting stud. The extreme lower end of the sleeve or die may be internally slotted at positions around its circumference as shown by the numeral 15 Figure 2 to assist in the screw cutting operation. The tool may be supplied or sold with three or other suitable number of dies each of which has a different internal aperture for engaging different sized studs but externally said dies are each adapted for use with the same body part 1.

What I claim as my invention and desire to secure by Letters Patent is:—

A screw stud extracting and thread cutting device comprising a body having a tapered bore extending to one end, a resilient diametrically expansible sleeve slidably keyed in said body, having a tapered portion to engage in said bore, and open at one side from end to end, said sleeve being further provided with an internal stud-receiving screw thread, and a screw having threaded engagement with the other end of said body and arranged to bear and rotate on the inner end of said sleeve, the threaded connection between the screw and the body being reverse to the internal thread of the sleeve.

In witness whereof I have hereunto set my hand in the presence of two witnesses.

WILLIAM WHELAN.

Witnesses:
ARTHUR H. BROWN,
EDGAR N. WHEELER.